United States Patent
Hertweck et al.

(10) Patent No.: US 6,789,511 B2
(45) Date of Patent: Sep. 14, 2004

(54) INTERNAL COMBUSTION ENGINE WITH COMPRESSION IGNITION

(75) Inventors: Gernot Hertweck, Fellbach (DE); Dirk Naber, Neckartailfingen (DE); Eckhard Sausen, Rudersberg (DE); Guido Vent, Oppenweiler (DE)

(73) Assignee: DaimlerChrysler AG, Stuttgart (DE)

( * ) Notice: Subject to any disclaimer, the term of this patent is extended or adjusted under 35 U.S.C. 154(b) by 8 days.

(21) Appl. No.: 10/307,876

(22) Filed: Dec. 2, 2002

(65) Prior Publication Data
US 2003/0116133 A1 Jun. 26, 2003

(30) Foreign Application Priority Data

Dec. 6, 2001 (DE) ........................................ 101 60 057

(51) Int. Cl.⁷ ............................................... F02B 47/00
(52) U.S. Cl. ...................................................... 123/1 A
(58) Field of Search ............................... 123/294–305, 123/1 A, 431, 568.14

(56) References Cited

U.S. PATENT DOCUMENTS

| | | | |
|---|---|---|---|
| 2,535,532 A | | 12/1950 | Emile et al. ................... 123/21 |
| 4,412,521 A | * | 11/1983 | Silva, Jr. ..................... 123/522 |
| 5,100,642 A | * | 3/1992 | Baycura ...................... 123/1 A |
| 6,010,544 A | * | 1/2000 | Haldeman et al. ............. 44/301 |
| 6,205,962 B1 | * | 3/2001 | Berry, Jr. ................... 123/73 A |
| 6,561,157 B2 | * | 5/2003 | zur Loye et al. ........... 123/295 |
| 2002/0020388 A1 | * | 2/2002 | Wright et al. ................ 123/304 |
| 2002/0040692 A1 | * | 4/2002 | LaPointe et al. ............. 123/431 |
| 2002/0053332 A1 | * | 5/2002 | Chamberlin et al. ..... 123/196 R |

FOREIGN PATENT DOCUMENTS

| | | |
|---|---|---|
| DE | 332 524 | 1/1921 |
| DE | 30 20 822 | 12/1981 |
| DE | 696 01 472 | 9/1999 |
| DE | 199 14 941 | 5/2000 |
| EP | 0 643 209 | 7/1997 |
| GB | 432 592 | 7/1935 |
| WO | WO 97/04044 | 2/1997 |
| WO | WO 00/60029 | 10/2000 |
| WO | WO 01/86128 | 11/2001 |

* cited by examiner

Primary Examiner—Erick Solis
(74) Attorney, Agent, or Firm—Kenyon & Kenyon

(57) ABSTRACT

A method for operating an internal combustion engine used as a fuel which, special fuel characteristics, during combustion by compression ignition may achieve a favorable efficiency, and may provide consumption advantages over conventional combustion methods using conventional fuels. The fuel used may be straight-run naphtha, which is also known as raw gasoline. The fuel characteristics of this fuel are less expensive than conventional fuels, since expensive further treatment of the fuel may be dispensed with during production.

34 Claims, 1 Drawing Sheet

INTERNAL COMBUSTION ENGINE WITH COMPRESSION IGNITION

CROSS-REFERENCE TO RELATED APPLICATIONS

The present application claims priority to Application No. 101 60 057.7, filed in the Federal Republic of Germany on Dec. 6, 2001, which is expressly incorporated herein in its entirety by reference thereto.

FIELD OF THE INVENTION

The present invention relates to a method for operating an internal combustion engine with compression ignition.

BACKGROUND INFORMATION

The aim of developing new internal combustion engines is to reduce fuel consumption and exhaust emissions. For example, in modern diesel engines, the majority of the problems are primarily in the formation of the soot particles and in the high nitrogen oxide emissions.

Internal combustion engines with compression ignition usually use diesel fuel, since the ignition properties of diesel fuel are eminently suitable for these internal combustion engines. Conventional diesel combustion is known to produce a diffusion flame combustion which leads in particular to a high level of particles being formed. To achieve lower emissions by combustion initiated by compression ignition, it is currently attempted in automatic-ignition internal combustion engines to use the combustion of a homogenous mix to achieve diesel combustion in which fewer soot particles are formed. With combustion of this type, it is possible to achieve substantially complete combustion with an extremely lean mix, with the result that the fuel consumption falls and low combustion temperatures occur at least at a low load. As a result, nitrogen oxide emissions are lower, since these low combustion temperatures generally are below the limit temperature for the formation of nitrogen oxide ($NO_x$).

An automatic-ignition combustion of a homogenous mix can be achieved by special conditioning of the fuel. German Published Patent Application No. 199 14 941 describes an internal combustion engine with compression ignition in which the combustion is assisted by the introduction of microwave radiation into the combustion chamber. In this case, the fuel mix is subjected to conditioning during an injection of microwave radiation, so that improved combustion takes place.

A further variant at achieving a homogenous compression-ignition combustion is attempted by the use of a plurality of fuels. European Published Patent Application No. 0 643 209 describes a method in which natural gas is used as the main fuel and diesel fuel is used as a readily ignitable pilot fuel, the injection times of the two fuels being dependent on the operating point of the internal combustion engine.

German Published Patent Application No. 30 20 822 describes a spark-ignition internal combustion engine in which raw gasoline is used instead of petrol and a capillary vaporizer nozzle is used to prepare this fuel so that it is in a gaseous phase before it is mixed with the combustion air, in order to improve the ignition properties of the raw gasoline.

German Published Patent Application No. 198 04 983 describes a method for operating an internal combustion engine with compression ignition in which, at the start of the compression cycle, a premixed lean fuel/air mix is present in the combustion chamber, and the mix is compressed until it reaches the automatic-ignition limit, further fuel being injected into the combustion chamber during the compression cycle. In this case, the quantity of fuel which is subsequently injected into the combustion chamber is introduced in a plurality of injection operations in terms of time and location, so that different ignition performances are formed in the combustion chamber.

In some of the variants described above, the fuel/air mix is ignited by heat of compression. In this case, a self-accelerating combustion process is initiated, in which insufficient compression leads to incomplete combustion and excessive compression causes unacceptable pressure rises.

It is an object of the present invention to provide a method for an internal combustion engine with compression ignition which allows combustion with a lower consumption and low pollutant emissions.

SUMMARY

The above and other beneficial objects of the present invention are achieved by providing a method as described herein.

The internal combustion engine according to the present invention provides that, to operate an internal combustion engine which has intake valves and exhaust valves, a control device and a fuel-feed device, first of all, in a method step, a fuel with a boiling range of 20° C. to 190° C. and an ignition performance of approximately 25 to 40 CN is introduced into the combustion chamber. The fuel may be injected in the intake pipe and/or directly into the combustion chamber. If the fuel is injected directly into the combustion chamber, which is filled with fresh air, the fuel/air mix in the cylinder is compressed so that the cylinder charge is automatically ignited by compression in the region of the top dead center. Alternatively, the fuel is injected into the intake pipe, so that it mixes with the air flowing into the combustion chamber through an induction pipe.

According to the present invention, the present method uses a fuel which, on account of the particular fuel characteristics, may achieve a favorable efficiency during combustion by compression ignition and may have consumption advantages over conventional combustion methods using conventional fuels. The fuel used may be straight-run naphtha, which is also known as raw gasoline. The fuel characteristics of this fuel according to the present invention may be achieved at lower cost than with conventional fuels, since expensive further treatment of the fuel may be eliminated during production. The high ability of the straight-run naphtha to withstand low temperatures means that there may be no fuel delivery problems, which are typical of diesel, at low temperatures, for example during the winter.

Working on the basis of the high volatility of straight-run naphtha, the method according to the present invention allows a virtually homogenous mix to be formed within a short time, which allows combustion by compression ignition, since the ignition performance of straight-run naphtha is not excessively high, so that low nitrogen oxide emissions and reduced formation of particles may be achieved. The high volatility achieves a good mix preparation, which is required for the compression ignition of a homogenous mix. As a result, extremely local air/fuel ratios ($\lambda \ll 1$ and $\lambda \gg 1$) in the mix and local temperature peaks in the combustion chamber during combustion may be prevented. The fact that the ignition performance is not excessively high allows the fuel according to the method of the present invention to have sufficient time for the preparation of the mix without it being automatically ignited. Incipient oxidation of a quantity of fuel which is injected first leads to the required mix temperature, at which the mix is made to ignite automatically by an ignition jet, being reached. The measure given for the ignition performance is the cetane number (CN). The number is closely related to the ignition delay time. This is the delay between the start of injection and the pressure rise caused by the combustion.

According to a further aspect of the present invention, the addition of a lubricating additive produces a fuel lubrication property which allows the use of conventional diesel fuel delivery devices. Commercially available lubricating additives may be provided, in which case a measuring method which is known for diesel fuels as the HFRR test method may be used to determine the lubricating property. HFRR stands for high frequency reciprocating rig test. It should be noted that this measuring method may have to be adapted for low-boiling fuels. For example, if the fuel straight-run naphtha, with a lubricating property according to HFRR of 922 $\mu$m is used, the addition of 50 ppm of lubricating additive makes it possible to achieve a lubricating property of 381 $\mu$m, so that it becomes possible to use conventional diesel fuel delivery devices. The lubricating property of the fuel should not significantly exceed approximately 460 $\mu$m, with a lubricating property of between, e.g., 200 and 400 $\mu$m being provided.

The use of the fuel straight-run naphtha may provide that no delivery problems which are typical of diesel are to be expected at cold ambient temperatures. In order, furthermore, to avoid possible misfires at low temperatures, it is possible for ignition accelerants to be admixed with the fuel. This may minimize or prevent possible misfires during the initiation of the automatic ignition or during the combustion. It is possible for 2-ethylhexyl nitrate to be admixed with the fuel as ignition accelerant.

According to a further aspect of the present invention, a quantity of exhaust gas which is recirculated into the combustion chamber and/or retained in the combustion chamber is varied as a function of parameters of the internal combustion engine, in particular as a function of load, so that the cylinder charge temperature may be adjusted. Furthermore, according to the present invention the total quantity of fuel in the combustion chamber is divided into a number of partial quantities, as a function of load, so that automatic ignition of the cylinder charge takes place at a defined time. The entire quantity of fuel may be injected during the compression cycle, part of the quantity of fuel also being injected in the induction cycle depending on the load point of the internal combustion engine. The fuel may be injected directly into the combustion chamber by an injection nozzle arranged in the combustion chamber, it being possible for a further injection nozzle arranged in the induction pipe to be provided for the injection of a partial quantity of the quantity of fuel in the induction pipe. The quantity of the partial injections and the time thereof may be controlled as function of load by a control device, so that compression ignition takes place with reduced exhaust emissions and a low consumption.

Furthermore, with the method according to the present invention it is possible to avoid incomplete combustion of the charge, misfires and extremely steep increases in pressure, which leads to a reduction in the noise produced during combustion and reduces the mechanical load on the engine.

An exemplary embodiment of the invention is illustrated in the drawing and is explained in more detail in the description which follows.

DETAILED DESCRIPTION

Figure 1:
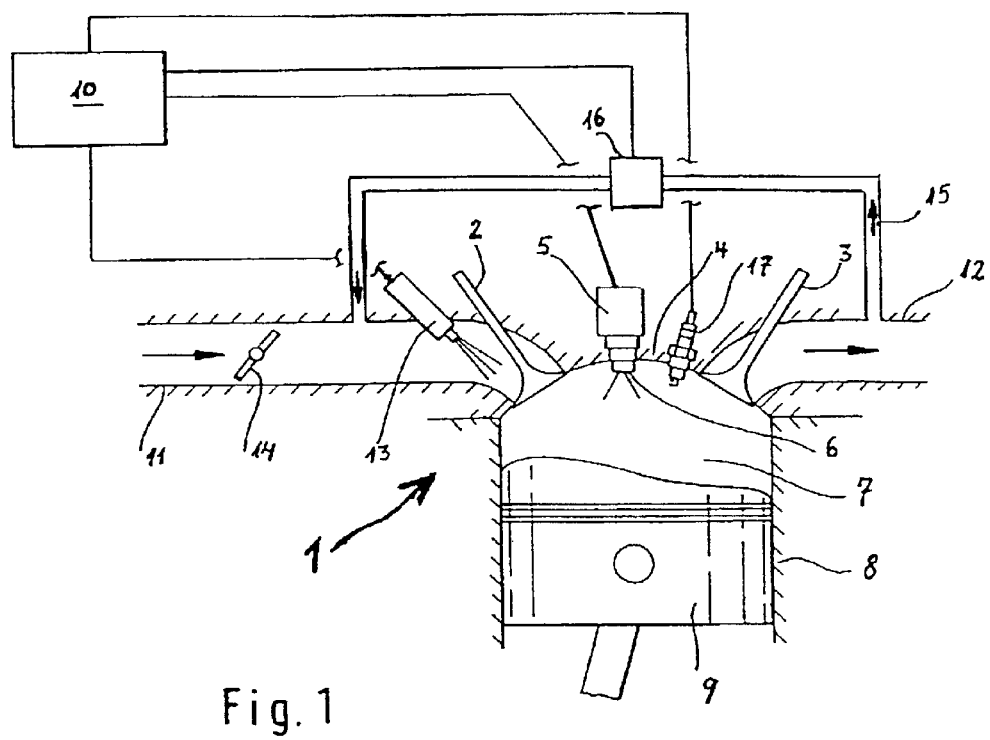
FIG. 1 is a schematic cross-sectional view of an internal combustion engine with which the method according to the present may be performed.

FIG. 1 is a schematic cross-sectional view of an internal combustion engine 1 according to the present invention which includes variably actuable intake valves 2, exhaust valves 3 and an injections system 5, which is arranged in a cylinder head 4, for injecting the fuel 6 into a combustion chamber 7. The combustion chamber 7 is delimited by the cylinder head 4 and a piston 9 arranged in the cylinder block 8. The quantity of fuel 6 introduced into the combustion chamber 7 is controlled as a function of load by a control unit 10 according to the internal combustion engine parameters at a specific time.

Furthermore, the internal combustion engine has an induction pipe 11 and an exhaust pipe 12.

Alternatively, an additional injection valve 13 may be provided in the induction pipe 11, with the injection system 5 arranged in the cylinder head 4, the additional injection valve 13 being arranged between a throttle valve 14 arranged in the induction pipe 11 and the intake valve 2.

Furthermore, the internal combustion engine 1 may be turbocharged. Furthermore, it may include a turbocharging device, e.g. an exhaust-gas turbocharger with a charge-air cooler for cooling the charge air. In addition, an exhaust-gas recirculation device for external exhaust-gas recirculation may be provided, in which a partial stream 15 is removed from the exhaust gas from the internal combustion engine 1 and is fed into the induction pipe 11 via a valve 16 which is actuated by the control unit 10. In addition, a heat exchanger may be provided, in order, for example, to utilize the heat which is present in the coolant of the internal combustion engine 1 to preheat the intake air in the induction pipe 11.

Alternatively, a defined mass of intake air and therefore a defined air/fuel ratio $\lambda$ may be produced by variably actuable intake and exhaust valves as a function of a driving load point during a cycle. The injection system 5 is actuated as a function of load, in order to determine a defined injection time and a defined injection quantity. In the case of multiple injection, the cycle sequence and cycle time may additionally be adjusted or varied.

The turbocharging device and the charge air cooler of the internal combustion engine may be actuated in order to set a defined charging pressure as a function of the load. The same also applies to the heat exchanger which is used to produce a defined temperature of the intake air. The exhaust-gas recirculation device supplies a defined quantity of exhaust gas which is recirculated to the combustion chamber. Since the quantity and temperature of the exhaust gases which remain in the combustion chamber 7 or are recirculated thereto may represent important variables influencing the control of the combustion process, accurate external exhaust-gas recirculation or internal exhaust-gas retention may be made possible by a variable valve control, e.g., with electromagnetic or electrohydraulic intake and exhaust valves.

The internal combustion engine 1 may operate according to the 4-stroke principle with an induction cycle, a compression cycle, a working cycle and an exhaust cycle. In the first cycle, the internal combustion engine 1 begins to suck in fresh air with the intake valve 2 open during a charge change. If appropriate, exhaust gas is retained in the combustion chamber 7. In the second, following cycle, the air which is sucked in is compressed with closed valves, part of the quantity of fuel being injected as a main injection during the compression. The time of the main injection is varied as a function of load, the quantity also being varied as a function of load. It is also possible for the main fuel injection quantity to be injected into the combustion chamber 7 in a plurality of partial quantities, so that a homogenous, lean air/exhaust gas/fuel mix is obtained by intensive mixing of fuel with fresh charge and if appropriate retained exhaust gas. Due to the high volatility, the fuel according to the present invention is vaporized very quickly and almost completely and therefore may mix ideally with the air within the compression cycle, so that there are no extreme air/fuel ratios formed locally within the mix in the combustion chamber 7. A uniformly distributed air/fuel ratio $\lambda$ of the virtually homogenous mix of $\lambda>1$ may be present. Since the fuel does not have an excessively high ignition performance, it is slow to ignite until the remaining quantity of fuel injected at the end of the compression around the top dead center. As a result, the mix which is present, which has reached a required temperature as a result of the compression and preliminary oxidation of some fractions of the fuel, is burnt by a compression ignition. The prevention of extreme air/fuel ratios and a high mix homogenization rate mean that no temperature peaks occur in the combustion chamber 7 during the homogenous combustion, which leads to low nitrogen oxide emissions and to a low likelihood of particle emissions due to the mix homogenization rate which is achieved. The ignition accelerants in the fuel may result in stable combustion without misfires.

The compression ignition of the cylinder charge is initiated by an ignition injection quantity in the form of an ignition jet. The ignition time may be determined, for example, by the injection time of the ignition injection quantity and/or if appropriate by the quantity of exhaust gas which is present in the combustion chamber. In the third cycle, the power which has been released by the combustion is transferred to the internal combustion engine 1 by the piston 9. In the fourth cycle, the exhaust gas is discharged with the exhaust valve 3 open.

When the internal combustion engine is started, the cylinder charge may undergo spark ignition until the combustion chamber or the exhaust gas has reached a temperature at which the conditions for automatic ignition of the cylinder charge are present. Furthermore, spark ignition may be provided at relatively high load points, since uncontrolled automatic ignition of the cylinder charge in the upper load range may lead to high pressure increases. Accordingly, an ignition system which may be actuated by the control device 10 may be provided with one spark plug 17 per cylinder for spark ignition of the air/fuel mix in the combustion chamber 7.

An example embodiment of the present invention may provide for it to be possible for variably actuable intake and exhaust valves to be actuated by the control unit 10 so that the start and the duration of the combustion of the cylinder charge are determined by the retained or recirculated quantity of exhaust gas in the combustion chamber 7 as a function of the internal combustion engine parameters. What is known as "internal exhaust-gas recirculation" may be achieved in a 4-stroke internal combustion engine by the variably actuable intake and exhaust valves. The intake and exhaust valves are actuated by the control device 10 so that exhaust gas is discharged from the combustion chamber 7 through the open exhaust valve 3 into the exhaust pipe 12 and is then sucked back into the combustion chamber 7 from the exhaust pipe 12.

If, alternatively, the exhaust gas is recirculated into the combustion chamber 7, numerous variants of exhaust-gas recirculation valves which may be used for the method according to the present invention are possible. The influence of the exhaust-gas retention or exhaust-gas recirculation or of the other parameters on the combustion process may be measured by suitable sensors, for example combustion-chamber pressure sensors.

What is claimed is:

1. A method for operating an internal combustion engine including intake valves, exhaust valves, a control device and a fuel-feed device, comprising:

forming a fuel/air mix including fresh air and a fuel having a boiling range of 20° C. to 190° C. and an ignition performance of approximately 25 to 40 CN and introducing the fuel/air mix into a combustion chamber;

igniting the fuel/air mix; and admixing a lubricating additive with the fuel so that the fuel has a lubricating property with a maximum value of approximately 460 $\mu$m.

2. The method according to claim 1, wherein the fuel-feed device includes an injection unit.

3. The method according to claim 1, wherein the fuel includes straight-run naphtha.

4. The method according to claim 1, wherein the maximum value of the lubricating property is determined according to a high frequency reciprocating rig test method.

5. The method according to claim 1, wherein the fuel has a lubricating property with a maximum value of between 200 and 400 $\mu$m according to a high frequency reciprocating rig test method.

6. The method according to claim 1, further comprising admixing an ignition accelerant with the fuel.

7. The method according to claim 6, wherein the ignition accelerant includes 2-ethylhexyl nitrate.

8. The method according to claim 1, further comprising at least one of retaining combustion exhaust gases in the combustion chamber and recirculating combustion exhaust gases to the combustion chamber.

9. The method according to claim 1, wherein the introducing step includes the substep of injecting the fuel directly into at least one of the combustion chamber and an induction pipe.

10. The method according to claim 1, further comprising dividing a total quantity of fuel into a plurality of separate partial quantities as a function of parameters of the internal combustion engine.

11. The method according to claim 1, further comprising dividing a total quantity of fuel into a plurality of separate partial quantities as a function of load of the internal combustion engine.

12. The method according to claim 1, wherein the introducing step includes the substep of injecting a total quantity of fuel as a main injection quantity during a compression cycle and then an ignition injection quantity in a region of top dead center as a function of parameters of the internal combustion engine.

13. The method according to claim 1, wherein the introducing step includes the substep of injecting a total quantity of fuel as a main injection quantity during a compression cycle and then an ignition injection quantity in a region of top dead center as a function of load of the internal combustion engine.

14. The method according to claim 12, wherein the main injection quantity is 80 to 90% of the total quantity of fuel and the ignition injection quantity is 10 to 20% of the total quantity of fuel.

15. The method according to claim 12, further comprising initiating a compression ignition of a cylinder charge by the ignition injection quantity in the form of an ignition jet.

16. The method according to claim 1, wherein the igniting step includes spark-ignition of a cylinder charge of the internal combustion engine in a starting phase.

17. The method according to claim 1, wherein the igniting step includes spark-ignition of a cylinder charge of the internal combustion engine in a high load range.

18. The method according to claim 1, wherein:

the fuel-feed device includes an injection unit;

the fuel includes straight-run naphtha.

19. The method according to claim 18, wherein the maximum value of the lubricating property is determined according to a high frequency reciprocating rig test method.

20. The method according to claim 18, wherein the fuel has a lubricating property with a maximum value of between 200 and 400 μm.

21. The method according to claim 18, further comprising admixing an ignition accelerant with the fuel.

22. The method according to claim 21, wherein the ignition accelerant includes 2-ethylhexyl nitrate.

23. The method according to claim 21, further comprising at least one of retaining combustion exhaust gases in the combustion chamber and recirculating combustion exhaust gases to the combustion chamber.

24. The method according to claim 21, wherein the introducing includes injecting the fuel directly into at least one of the combustion chamber and an induction pipe.

25. The method according to claim 21, further comprising dividing a total quantity of fuel into a plurality of separate partial quantities as a function of parameters of the internal combustion engine.

26. The method according to claim 21, further comprising dividing a total quantity of fuel into a plurality of separate partial quantities as a function of load of the internal combustion engine.

27. The method according to claim 21, wherein the introducing includes injecting a total quantity of fuel as a main injection quantity during a compression cycle and then an ignition injection quantity in a region of top dead center as a function of parameters of the internal combustion engine.

28. The method according to claim 21, wherein the introducing includes injecting a total quantity of fuel as a main injection quantity during a compression cycle and then an ignition injection quantity in a region of top dead center as a function of load of the internal combustion engine.

29. The method according to claim 27, wherein the main injection quantity is 80 to 90% of the total quantity of fuel and the ignition injection quantity is 10 to 20% of the total quantity of fuel.

30. The method according to claim 27, further comprising initiating a compression ignition of a cylinder charge by the ignition injection quantity in the form of an ignition jet.

31. The method according to claim 21, wherein the igniting includes spark-ignition of a cylinder charge of the internal combustion engine in a starting phase.

32. The method according to claim 21, wherein the igniting includes spark-ignition of a cylinder charge of the internal combustion engine in a high load range.

33. The method according to claim 28, wherein the main injection quantity is 80 to 90% of the total quantity of fuel and the ignition injection quantity is 10 to 20% of the total quantity of fuel.

34. The method according to claim 28, further comprising initiating a compression ignition of a cylinder charge by the ignition injection quantity in the form of an ignition jet.

* * * * *